A. R. FORS.
CUTTING TOOL.
APPLICATION FILED JULY 15, 1920.
1,396,180.
Patented Nov. 8, 1921.
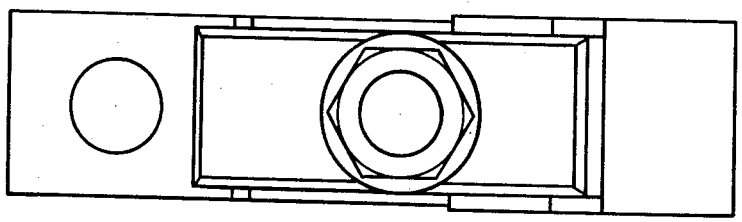
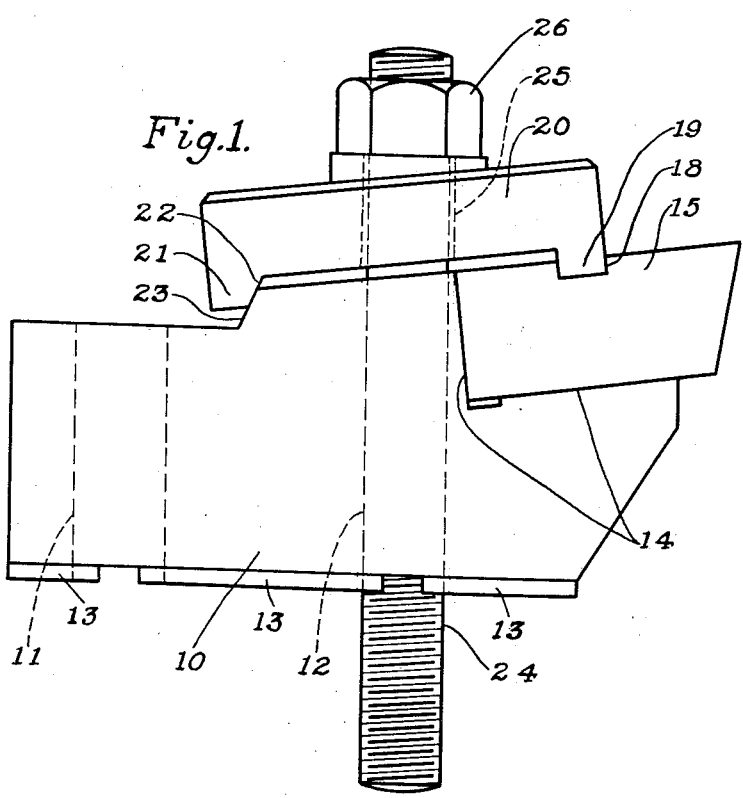
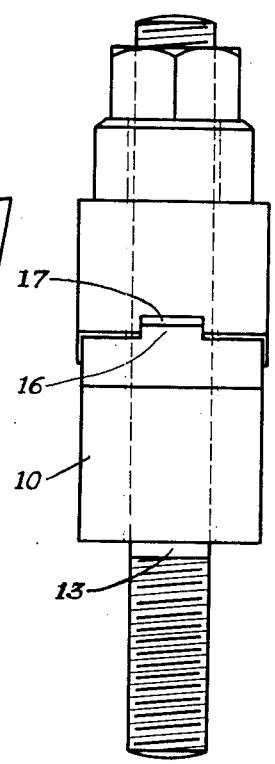
INVENTOR
Arthur R. Fors
BY Albert C. Bell
ATTORNEY

UNITED STATES PATENT OFFICE.

ARTHUR R. FORS, OF DETROIT, MICHIGAN, ASSIGNOR TO CONTINENTAL MOTORS CORPORATION, OF DETROIT, MICHIGAN, A CORPORATION OF VIRGINIA.

CUTTING-TOOL.

1,396,180.        Specification of Letters Patent.        Patented Nov. 8, 1921.

Application filed July 15, 1920. Serial No. 396,399.

*To all whom it may concern:*

Be it known that I, ARTHUR R. FORS, a citizen of the United States, residing at Detroit, in the county of Wayne and State of Michigan, have invented a new and useful Improvement in Cutting-Tools, of which the following is a specification.

My invention relates to an improved form of cutting tool for use generally in machine tools, by which the amount of high grade relatively expensive steel required for the cutting bit may be reduced to a minimum, the main portion of the tool being of cheaper material constructed in a manner to positively hold the cutting bit in position and give as satisfactory results as though the entire tool were formed from the expensive material.

My invention will best be understood by referring to the accompanying drawings showing a preferred embodiment thereof, in which—

Figure 1 shows the tool complete in side elevation,

Fig. 2 is a top view of the parts shown in Fig. 1, and

Fig. 3 is a right hand elevation of the parts shown in Fig. 1.

Similar numerals refer to similar parts throughout the several views.

As shown in the drawings my improved cutting tool consists of a base 10 of relatively inexpensive material such as machinery steel through which two parallel holes 11 and 12 are drilled to secure the tool in place in the machine in which the tool is to be used. The portion 10 has projecting from its lower surface a key 13 for engagement for a corresponding keyway in the machine with which the tool is used to prevent displacement of the tool while it is in operation. The particular design of tool shown is adapted for use in connection with a movable head machine, as for example of the turret type, where several tools are rigidly secured to a turret head. It will be understood however, that I do not limit myself to this particular construction of tool, as my improved tool may be used to advantage in any form of lathe or power machine in which it is desirable to employ a cutting bit of high speed and therefore relatively expensive steel.

The base portion 10, adjacent to the cutting portion of the tool has a notch or rest 14 cut in it, the sides of which are preferably at right angles to each other and inclined sufficiently so that the parallel sided cutting bit 15 will have its upper surface inclined at the proper angle to the work to be done. The lower surface of the notch 14 is provided with a longitudinally extending key 16 entering a corresponding keyway 17 in the cutting bit 15. The cutting bit is provided with a transverse groove 18 in its upper surface engaged by a corresponding projecting lug 19 formed on the clamping bar 20, which extends rearwardly from the cutting bit and clear of the base portion 10 of the tool and terminates in a downwardly extending offset portion 21 having an inner inclined surface 22 engaging a correspondingly inclined surface 23 on the base portion 10. The bolt or stud 24 extends through the hole 12 in which it may fit as desired and also through a clearance opening 25 in the clamping bar 20. Where the bolt 24 is rigidly held in the base portion 10, the bit 15 may be clamped in place by the nut 26 before the tool is placed in the machine and it will be observed that the clamping action holds the bit rigidly against the body portion 10 in two directions, as by the downward action of the tongue 19 the bit 15 is held firmly against the lower face of the notch 14 and by the action of the cooperating inclined surfaces 23 and 22 the clamping action tends to move the clamping bar and therefore the bit 15 rearwardly and holds the cutting bit positively against the rear face of the notch 14.

In this manner a small cutting bit of expensive material may be used with a base of cheap material and the cutting bit may have the full width of the base portion which is to be desired for many operations necessarily performed by machine tools. The projecting lower end of the bolt 24, and a second similar fastening device extending through the hole 11 may be used to secure the complete tool in desired position in the machine with which the tool is used. Where the bolt 24 is not rigidly held in the body portion 10, the clamping action described is secured after the tool is put in place in the machine, by tightening the nut 26.

As a result of the construction described, it will appear that the cutting bit is positively held in all directions by the clamping action and that therefore the results secured are the same to all intents and purposes as though the entire tool were made of expensive high speed steel. It will also appear that it is not necessary that the cutting bit shall be of any particular conformation as to its cutting edge, but that on the other hand this may be of any conformation desired to meet the requirements of any particular work done.

While I have shown my invention in the particular embodiment above described, I do not however, limit myself to this exact construction in carrying out my invention as I may employ equivalents thereof known to the art at the time of filing this application without departing from the scope of the appended claims.

What I claim is:

1. In a cutting tool, the combination of a body portion having a notch in its upper forward corner and an inclined surface to the rear of said notch, a cutting bit having its bottom and rear end fitting said notch and provided with a transverse notch in its upper surface, a clamping bar engaging said transverse notch and said inclined surface, and a clamping bolt extending vertically through said body portion and clamping bar.

2. In a cutting tool, the combination of a body portion having a notch in its upper forward corner and an inclined surface to the rear of said notch, a cutting bit having its bottom and rear end fitting said notch and provided with a transverse notch in its upper surface, a clamping bar engaging said transverse notch and said inclined surface, and a clamping bolt extending vertically through said body portion and clamping bar, there being a key and keyway engagement between the lower face of said bit and said body portion.

3. In a cutting tool, the combination of a parallel sided body portion having a right angled notch in its upper forward corner, the lower surface of said notch being inclined at a cutting angle, a cutting bit of rectangular cross section fitting said notch and having a transverse groove in its upper surface, said body portion having a forwardly and inclined surface to the rear of said notch, a clamping bar having a downwardly projecting tongue at its forward end engaging said groove and a downwardly offset portion at its rear end engaging said inclined surface and clearing said body portion between said tongue and said offset portion, and a clamping bolt extending through said body portion and clamping bar between said tongue and said offset portion.

4. In a cutting tool, the combination of a parallel sided body portion having a right angled notch in its upper forward corner, the lower surface of said notch being inclined at a cutting angle, a cutting bit of rectangular cross section fitting said notch and having a transverse groove in its upper surface, said body portion having a forwardly and inclined surface to the rear of said notch, a clamping bar having a downwardly projecting tongue at its forward end engaging said groove and a downwardly offset portion at its rear end engaging said inclined surface and clearing said body portion between said tongue and said offset portion, and a clamping bolt extending through said body portion and clamping bar between said tongue and said offset portion, there being a longitudinal key and keyway engagement between said notch and the lower surface of said bit.

5. A tool holder including a bar having a transversely disposed inclined surface and provided with an extension having a rib, a tool adapted to rest on said extension and provided with a groove adapted to be entered by said rib on said extension, said tool further provided with a transversely disposed groove, and a clamp having ribs adapted to enter the transversely disposed groove in said tool and bear against the inclined surface of the bar respectively whereby said tool is gripped between said bar and clamp.

6. In a cutting tool, the combination of a body portion having a notch in its upper forward corner and an inclined surface to the rear of said notch, a cutting bit having its bottom and rear end fitting said notch and provided with a transverse notch in its upper surface, a clamping bar for engaging said transverse notch and said inclined surface, and a clamping bolt connecting said body portion and clamping bar.

In witness whereof, I hereunto subscribe my name this 29th day of June, A. D. 1920.

ARTHUR R. FORS.